United States Patent
Hisamura et al.

(10) Patent No.: US 11,608,663 B2
(45) Date of Patent: Mar. 21, 2023

(54) DOOR STRIKER ATTACHING STRUCTURE AND UTILITY VEHICLE INCLUDING THE SAME

(71) Applicant: KAWASAKI JUKOGYO KABUSHIKI KAISHA, Kobe (JP)

(72) Inventors: Takashi Hisamura, Akashi (JP); Masato Kinoshita, Kakogawa (JP); Akihiro Fukumoto, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 741 days.

(21) Appl. No.: 16/409,124

(22) Filed: May 10, 2019

(65) Prior Publication Data

US 2020/0354995 A1 Nov. 12, 2020

(51) Int. Cl.
*E05B 85/04* (2014.01)
*E05B 15/02* (2006.01)

(52) U.S. Cl.
CPC .......... *E05B 85/04* (2013.01); *E05B 15/0205* (2013.01); *B60Y 2200/20* (2013.01); *E05Y 2900/531* (2013.01); *Y10T 292/68* (2015.04)

(58) Field of Classification Search
CPC . E05B 85/04; E05B 15/0205; B60Y 2200/20; E05Y 2900/531; Y10T 292/68; Y10S 292/38; Y10S 292/56
See application file for complete search history.

(56) References Cited

U.S. PATENT DOCUMENTS

| | | | | |
|---|---|---|---|---|
| 4,981,313 A * | 1/1991 | Makamura | ............ | E05B 85/045 292/340 |
| 5,263,752 A * | 11/1993 | Phail-Fausey | ........ | E05B 85/045 292/216 |
| 5,494,208 A * | 2/1996 | Granger | ................ | E05B 85/045 228/173.6 |
| 6,106,037 A * | 8/2000 | Burton | .................. | E05B 85/045 292/340 |
| 6,155,618 A * | 12/2000 | Ichinose | ............... | E05B 85/045 292/216 |
| D442,907 S * | 5/2001 | Santelman | ............ | E05B 85/045 D12/223 |
| 6,631,933 B1 * | 10/2003 | Westerwick | .......... | E05B 85/045 292/340 |
| 8,459,724 B2 | 6/2013 | Tsumiyama et al. | | |

(Continued)

*Primary Examiner* — Christine M Mills
*Assistant Examiner* — Faria F Ahmad
(74) *Attorney, Agent, or Firm* — Wenderoth, Lind & Ponack, L.L.P.

(57) ABSTRACT

In a door striker attaching structure, a door striker includes a rod and a base plate, in which the base plate includes rod support portions to which the rod is connected, and a pair of fastening portions through which the base plate is fastened to a vehicle body of a utility vehicle. The vehicle body is provided with fastening holes to which the fastening portions are fastened, and each of the fastening holes is an elongated hole having two central portions. The door striker is symmetric with respect to a first center line that connects centers of the fastening portions, and by inverting the door striker along the first center line, a second center line that connects centers of the rod support portions is biased in a direction along the first center line by a distance equal to a central distance between the central portions of the fastening holes.

6 Claims, 9 Drawing Sheets

(56) References Cited

U.S. PATENT DOCUMENTS

| | | | | |
|---|---|---|---|---|
| 2002/0089195 A1* | 7/2002 | Sawajiri | ................ | E05B 85/045 |
| | | | | 292/341 |
| 2003/0107222 A1* | 6/2003 | Paskonis | ................ | E05B 77/38 |
| | | | | 292/340 |
| 2004/0119299 A1* | 6/2004 | Paskonis | ............... | E05B 85/045 |
| | | | | 292/340 |
| 2005/0218669 A1* | 10/2005 | Johnson | ................ | E05B 85/045 |
| | | | | 292/340 |
| 2006/0055179 A1* | 3/2006 | Burton | ................. | E05B 85/045 |
| | | | | 292/216 |
| 2007/0114802 A1* | 5/2007 | Johnson | ................ | E05B 85/045 |
| | | | | 292/340 |
| 2007/0262595 A1* | 11/2007 | Johnson | ................ | E05B 85/045 |
| | | | | 292/340 |
| 2008/0231059 A1* | 9/2008 | Nishio | ................. | E05B 85/045 |
| | | | | 292/246 |
| 2009/0079208 A1* | 3/2009 | Mizuno | ................ | E05B 85/045 |
| | | | | 292/340 |
| 2009/0250947 A1* | 10/2009 | Wiese | ................... | E05B 85/045 |
| | | | | 292/216 |
| 2009/0295196 A1* | 12/2009 | Bambenek | ............ | E05B 85/045 |
| | | | | 296/207 |
| 2012/0286525 A1* | 11/2012 | Kordowski | ........... | E05B 85/045 |
| | | | | 292/340 |

* cited by examiner

DOOR STRIKER ATTACHING STRUCTURE AND UTILITY VEHICLE INCLUDING THE SAME

BACKGROUND OF THE INVENTION

1. Field of the Invention

The present invention relates to a door striker attaching structure and a utility vehicle including the same.

2. Description of the Related Art

Conventionally, a door striker of a utility vehicle has a left-right symmetrical shape, and a fastening hole through which a base plate of the door striker is fastened to the vehicle body of the utility vehicle is an elongated hole in order to ensure an adjustment allowance for attaching the door striker (see U.S. Pat. No. 8,459,724).

SUMMARY OF THE INVENTION

Considering manufacturing tolerances due to welding of body frames and doors, it is sometimes difficult to attach a door striker with a conventional adjustment allowance, and in order to deal with this, it is necessary to secure a larger adjustment allowance. However, if a central distance of the elongated hole is increased in order to secure a larger adjustment allowance, there arises a problem that the mounting strength of the door striker decreases.

In view of the above, an object of the present invention is to provide a door striker attaching structure and a utility vehicle including the door striker attaching structure capable of increasing the adjustment allowance for attaching the door striker as compared with conventional door striker attaching structures, while maintaining the conventional central distance of the elongated hole.

In order to achieve the above object, a first aspect of the present invention provides a door striker attaching structure including a door striker having a rod and a base plate, wherein the base plate includes a pair of rod support portions to which the rod is connected, and a pair of fastening portions through which the base plate is fastened to a vehicle body of a utility vehicle, wherein the vehicle body is provided with fastening holes to which the fastening portions are fastened respectively, and each of the fastening holes is an elongated hole having two central portions, wherein the door striker is symmetric with respect to a first center line that connects centers of the fastening portions, and wherein by inverting the door striker along the first center line, a second center line that connects centers of the rod support portions is biased in a direction along the first center line by a distance equal to a central distance between the central portions of each of the fastening holes.

According to the above configuration, by inverting the door striker along the first center line, the second center line is biased in a direction along the first center line by a distance equal to the central distance of each of the elongated holes. Thus, attaching the door striker to the fastening holes in an inverted manner along the first center line makes it possible to secure an adjustment allowance twice the central distance of each of the fastening hole. That is, the adjustment allowance for attaching the door striker can be doubled as compared with conventional door striker attaching structures, while maintaining the conventional central distance of the fastening hole.

It is preferable that the present invention further includes the following configurations.

(1) The base plate has an outer shape that is asymmetric with respect to the second center line.

(2) The rod has a U-shape protruding outward in a vehicle-width direction of the utility vehicle, and is attached to the base plate at both ends of the U-shape, the second center line extends in a vertical direction, and the first center line is orthogonal to the second center line, and extends in a front-back direction of the utility vehicle.

(3) The door striker is attached to a frame that is disposed between an upper end of a backrest and an upper end of a seat bottom of a seat of the utility vehicle.

The above configuration (1) makes it easy to grasp the attached state of the door striker (a difference between a first attached state in which the rod is shifted in one direction along the first center line and a second attached state in which the rod is shifted in the other direction along the first center line) with reference to the outer shape of the base plate.

According to the configuration (2), a vertically extending portion of the rod is to be locked with a latch provided on a door, so that it is possible to lock the door striker with good resistance to vibration in the vertical direction.

In the case where a driver or a passenger bumps against the door, it is usually the elbow or shoulder of the driver or the passenger that bumps against the door. Therefore, according to the configuration (3), the door striker is provided on a frame located in the vicinity of the elbow or shoulder of a driver or a passenger to support the door, which improves the structural strength of the door at the time when a driver or a passenger bumps against the door.

A second aspect of the present invention provides a utility vehicle including the door striker attaching structure according to the first aspect.

According to the above configuration, it is possible to provide a utility vehicle including the door striker attaching structure capable of increasing the adjustment allowance for attaching the door striker as compared with conventional door striker attaching structures, while maintaining the conventional central distance of the elongated hole.

In view of the above, the present invention provides a door striker attaching structure capable of increasing the adjustment allowance for attaching the door striker as compared with conventional door striker attaching structures, while maintaining the conventional central distance of the elongated hole.

BRIEF DESCRIPTION OF THE DRAWINGS

FIGS. 10(a)-(d) are views illustrating attached states of the door striker.

DETAILED DESCRIPTION OF THE PREFERRED EMBODIMENTS

Hereinafter, a utility vehicle having a door striker attaching structure according to one embodiment of the present invention will be described with reference to the accompanying drawings. Utility vehicles are off-road vehicles mainly for travelling off the road, not only grasslands, gravels, sandy areas, but also unpaved areas, such as mountain roads, forest roads, and muddy and rocky areas. For the sake of explanation, the traveling direction of a utility vehicle is referred to as the "front" of the utility vehicle and components thereof, and the left and right in the vehicle-width direction when a driver or a passenger of the utility vehicle looks forward is referred to as the "left and right" of the utility vehicle and components thereof.

[Overall Structure of Vehicle]

Figure 1:
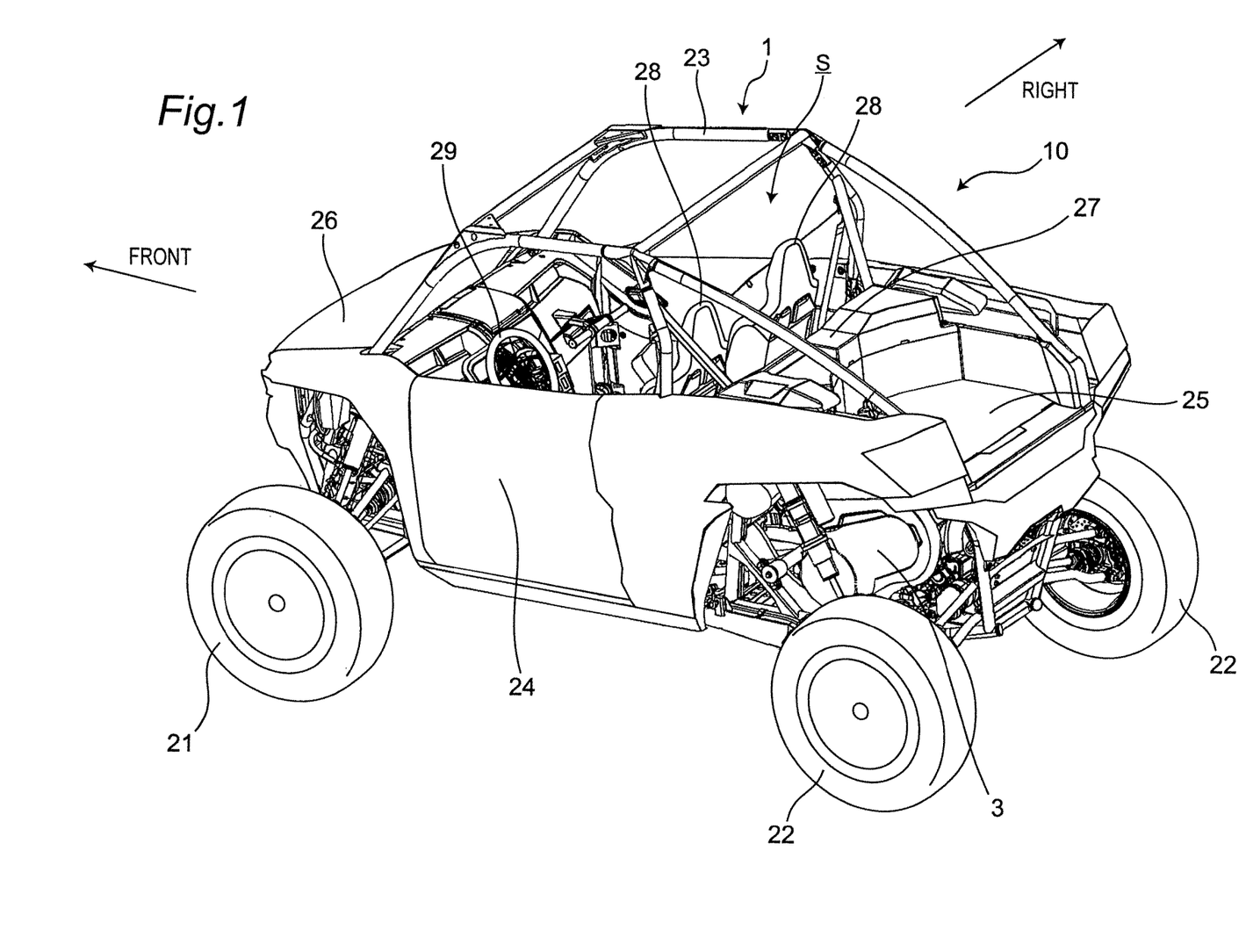
FIG. 1 is a perspective view of a utility vehicle having a door striker attaching structure according to one embodiment of the present invention.
Figure 2:
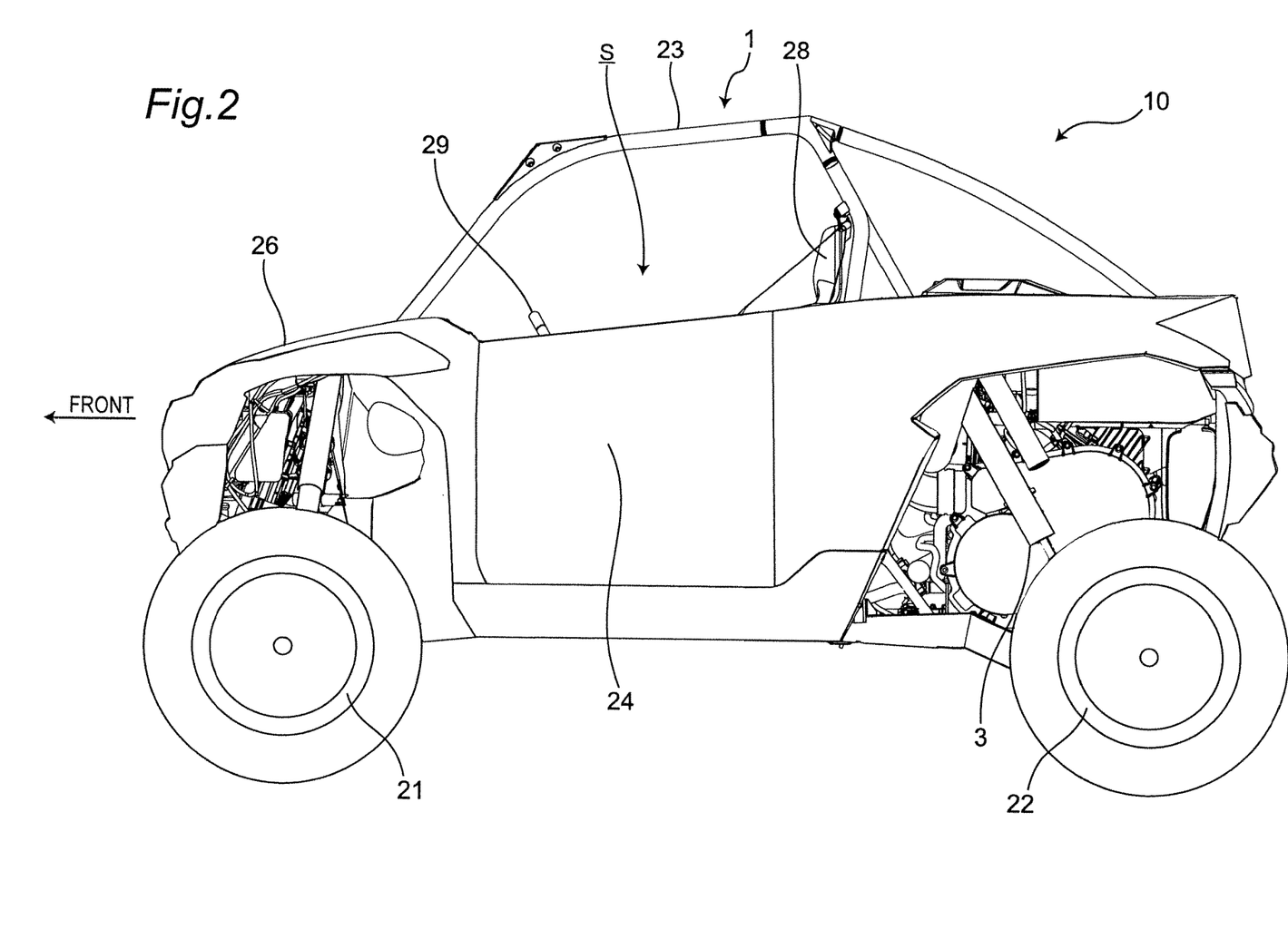
FIG. 2 is a left side view of the utility vehicle shown in FIG. 1.

FIG. 1 is a perspective view of a utility vehicle having a door striker attaching structure according to one embodiment of the present invention, and FIG. 2 is a left side view of the utility vehicle shown in FIG. 1.

As shown in FIGS. 1 and 2, a utility vehicle 10 includes a pair of left and right front wheels 21 at a front portion of a vehicle body, a pair of left and right rear wheels 22 at a rear part of the vehicle body, and a riding space (cabin) S between the front wheels 21 and the rear wheels 22. The riding space S is surrounded by a ROPS 23 and a pair of left and right doors 24. A ROPS is the abbreviation for a rollover protective structure, and is a part of a body frame 1.

A cargo bed 25 is provided behind the riding space S, and a bonnet 26 is provided in front of the riding space S. Further, a back panel 27 is provided at a front end of the cargo bed 25 as a partition between the cargo bed 25 and the riding space S.

The riding space S includes a pair of left and right independent seats 28. An operation portion, such as a steering wheel 29, is provided in front of the seats 28.

A power unit 3 is provided below the cargo bed 25. The power unit 3 includes an engine and a transmission. A driving force of the engine is transmitted to the transmission, and the transmission transmits the driving force to the pairs of left and right front wheels 21 and rear wheels 22.

[Structure of Body Frame]

Figure 3:
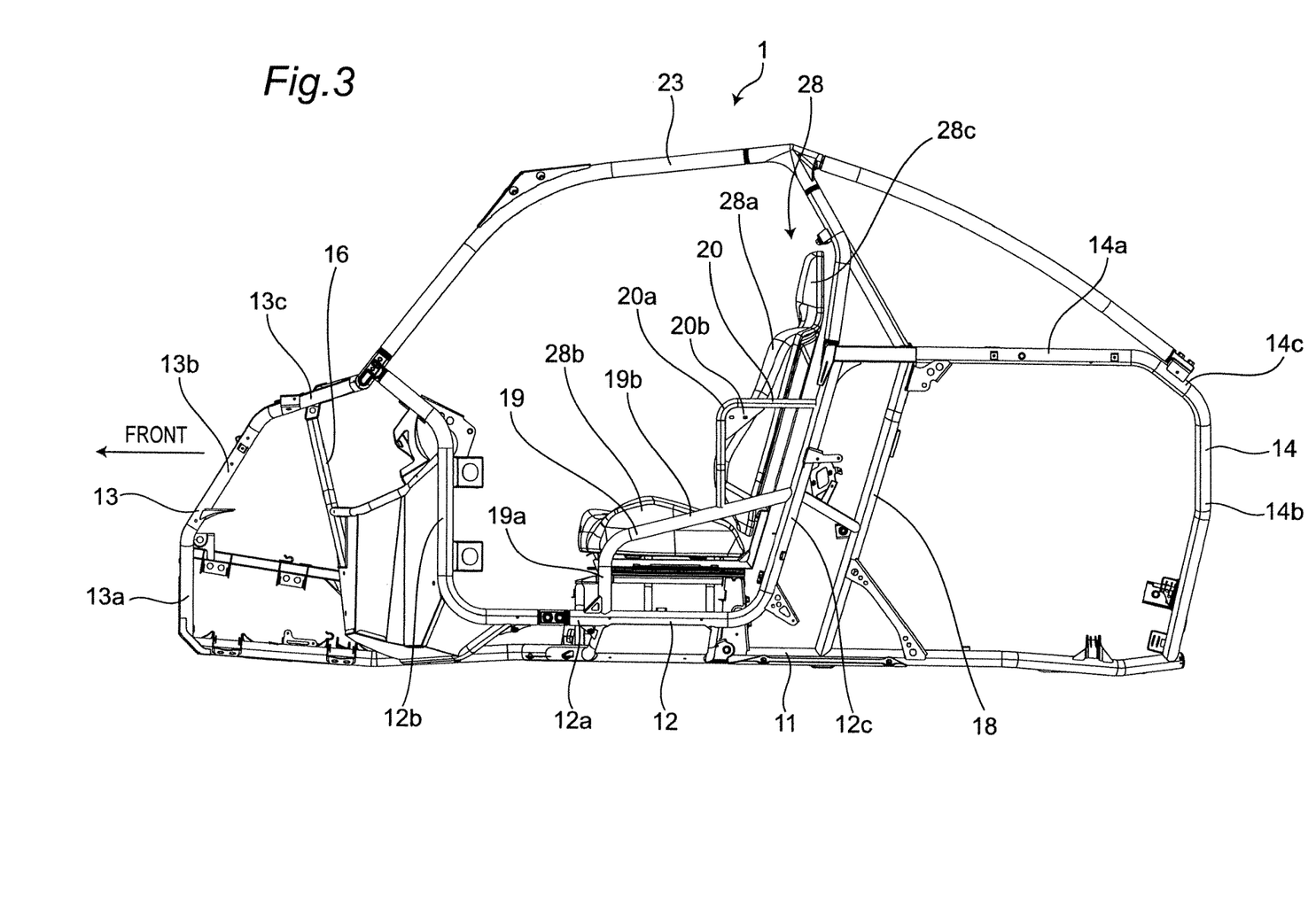
FIG. 3 is a side view of a body frame and a seat shown in FIG. 2.
Figure 4:
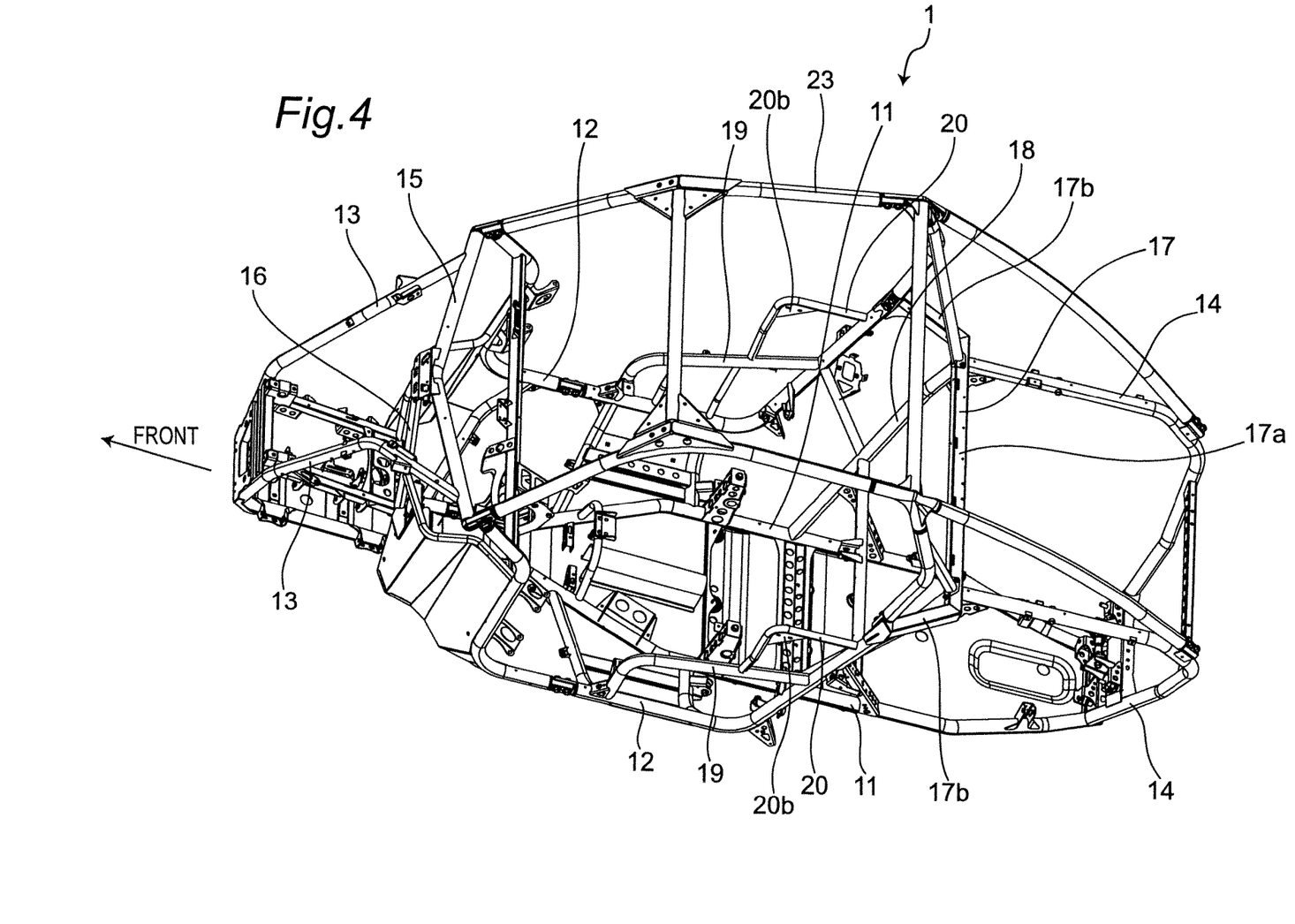
FIG. 4 is a perspective view of the body frame.

FIG. 3 is a side view of the body frame 1 and the seats 28 shown in FIG. 2, and FIG. 4 is a perspective view of the body frame 1. As shown in FIGS. 3 and 4, the body frame 1 includes a pair of left and right main frames 11, a pair of left and right side frames 12, a pair of left and right front frames 13, and a pair of left and right rear frames 14.

The main frames 11 form a skeleton of the body frame 1, and extend in the longitudinal direction (the front-rear direction) of the vehicle body. Each of the side frames 12 is disposed on the side of corresponding one of the main frames 11. The front frames 13 are respectively disposed on front upper portions of the main frames 11. The rear frames 14 are respectively disposed on rear upper portions of the main frames 11.

The pairs of the main frames 11, the side frames 12, the front frames 13, and the rear frames 14 are disposed substantially symmetrically in the lateral direction of the vehicle body (in the vehicle-width direction). At least one cross bar is provided each of between the pair of left and right main frames 11, between each of the main frames 11 and corresponding one of the side frames 12, between the pair of left and right front frames 13, and between the pair of left and right rear frames 14. The cross bar connects these frames in the vehicle-width direction, which increases rigidity in the vehicle-width direction of the body frame 1.

Each of the side frames 12 is positioned outside of corresponding one of the main frames 11 in the vehicle-width direction, and is connected to the corresponding one of the main frames 11 by a plurality of the cross bars. Each of the side frames 12 extends in the front-rear direction as a whole, and has a substantially U-shape in a side view.

Each of the front frames 13 has a front vertical frame part 13a, a middle oblique frame part 13b, and a front oblique frame part 13c. The front vertical frame part 13a extends in a direction of the vehicle height (in a vertical direction). The middle oblique frame part 13b extends upwardly and slopes rearwardly from an upper end of the front vertical frame part 13a. The front oblique frame part 13c extends upwardly and slopes rearwardly and outwardly in the vehicle-width direction from an upper end of the middle oblique frame part 13b.

The lower end of the front vertical frame part 13a is fixed to a front end of corresponding one of the main frames 11 by welding or the like. The upper end of the front oblique frame part 13c is fixed to a front cross member 15 by welding or the like. The front cross member 15 extends in the vehicle-width direction and has a substantially V-shape in a front view of the vehicle body. The front cross member 15 is supported by a front support frame 16 that is erected obliquely forward at the front portion of the main frames 11.

The rear frames 14 are positioned at a rear part of the body frame 1, and each of the rear frames 14 extends in the front-rear direction as a whole, and has a substantially L-shape in a side view of the vehicle body. Each of the rear frames 14 includes a rear upper frame part 14a, a rear vertical frame part 14b, and a rear curved frame part 14c. The rear upper frame part 14a extends in the front-rear direction. The rear vertical frame part 14b extends downwardly and obliquely inward in the vehicle-width direction. The rear curved frame part 14c is curved so as to couple the rear upper frame part 14a and the rear vertical frame part 14b. In each of the rear frames 14, the lower end of the rear vertical frame part 14b is fixed to a rear end of a corresponding one of the main frames 11 by welding or the like. The front end of the rear upper frame part 14a is fixed to a rear cross member 17 by welding or the like.

The rear cross member 17 includes a rear lateral bar part 17a and left and right rear oblique bar parts 17b. The rear lateral bar part 17a is disposed in the middle of the rear cross member 17 and extends in the vehicle-width direction. Each of the rear oblique bar parts 17b is disposed on the side of the rear lateral bar part 17a, and extends forwardly and obliquely outward in the vehicle-width direction. The rear lateral bar part 17a is supported by rear support frames 18 that extend obliquely rearward from an intermediate portion in the front-rear direction of the respective main frames 11.

Each of the side frames 12 includes a lower end part 12a disposed at the bottom and extending in the front-rear direction, a front part 12b extending upwardly and forwardly from the front end of the lower end part 12a, and a rear part 12c extending upwardly from the rear end of the lower end part 12a. The side frames 12 are provided with individual sub frames 19 each of which connects an intermediate portion in the front-rear direction of the lower end part 12a with an intermediate portion in the vertical direction of the rear part 12c.

Each of the sub frames 19 includes a front part 19a extending upwardly from the intermediate portion in the front-rear direction of the lower end part 12a of corresponding one of the side frames 12, and a rear part 19b extending upwardly and obliquely rearward from the upper end of the front part 19a and connected to the intermediate portion in the vertical direction of the rear part 12c of the corresponding one of the side frames 12. The sub frames 19 are provided with individual upper sub frames 20 each of which connects an intermediate portion in the front-rear direction of the rear part 19b of corresponding one of the sub frames 19 with an intermediate portion in the vertical direction of the rear part 12c of corresponding one of the side frames 12.

The position where each of the upper sub frames 20 is connected to the rear part 12c of corresponding one of the side frames 12 is higher than the position where corresponding one of the sub frames 19 is connected to the rear part 12c of the corresponding one of the side frames 12. Each of the upper sub frames 20 has an L-shape in a side view of the vehicle body, and includes a curved part 20a to which a bracket 20b is fixed. The bracket 20b includes a pair of fastening holes 20c aligned in the front-rear direction to which a door striker is attached.

[Attaching Structure of Door Striker]

Figure 5:
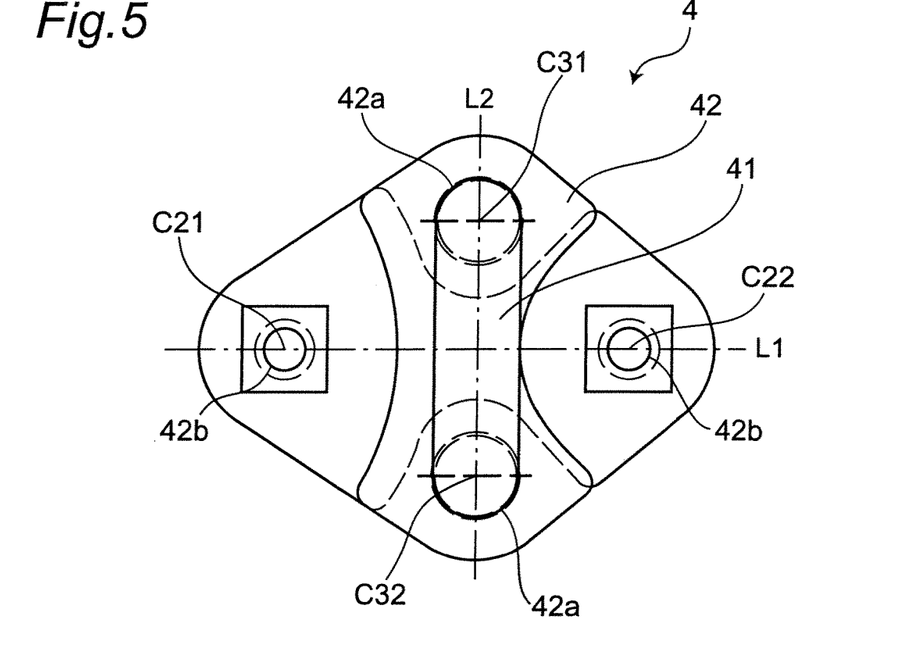
FIG. 5 is a front view of a door striker.
Figure 6:
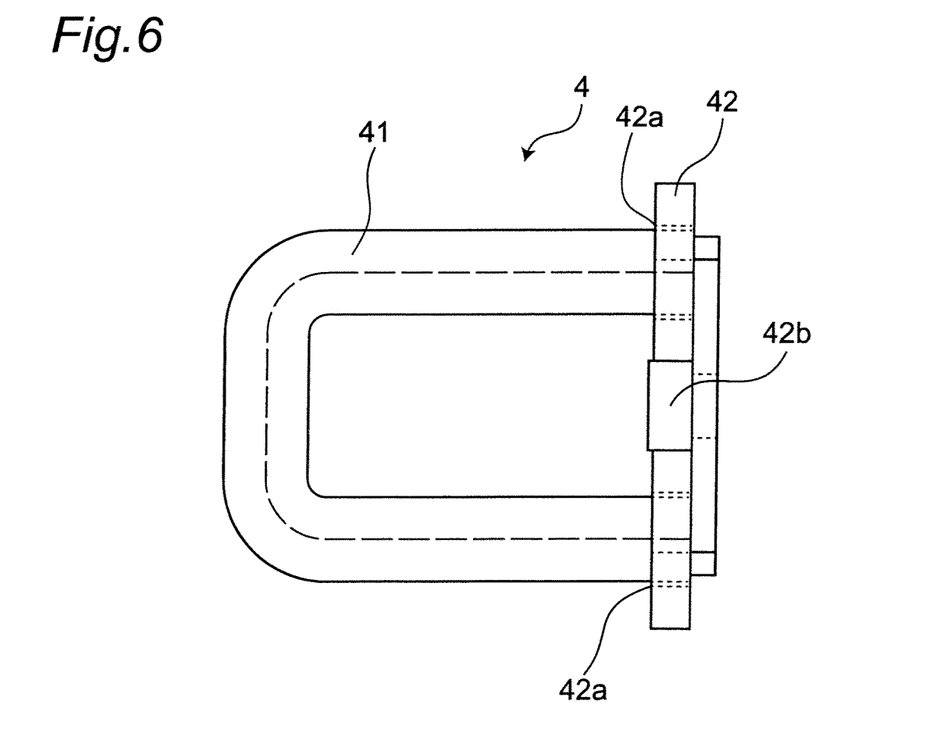
FIG. 6 is a side view of the door striker.
Figure 7:
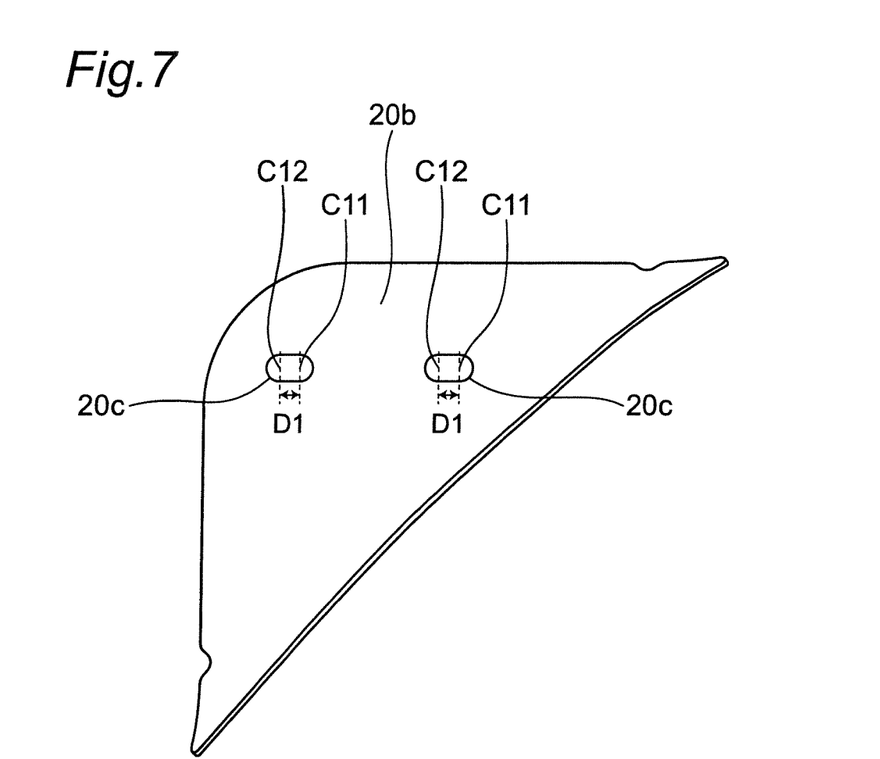
FIG. 7 is an enlarged view of the body frame to which the door striker is attached.

FIG. 5 is a front view of a door striker 4, FIG. 6 is a side view of the door striker 4, and FIG. 7 is an enlarged view of the body frame 1 to which the door striker 4 is attached. As shown in FIGS. 5 to 7, the door striker 4 is configured to be attached to the bracket 20b fixed to each of the upper sub frames 20 of the body frame 1. The door striker 4 includes a rod 41 and a base plate 42. The base plate 42 includes a pair of rod support portions 42a to which the rod 41 is connected, and a pair of fastening portions 42b through which the base plate 42 is fastened to the bracket 20b.

As shown in FIG. 3, the bracket 20b is disposed between the upper end of a backrest 28a and the upper end of a seat bottom 28b of each of the seats 28 of the utility vehicle 10. The backrest 28a is a part that supports the back of a driver or a passenger when the driver or the passenger sits on the seat 28, and the seat bottom 28b is a part where a driver or a passenger is seated on the seat 28. That is, the door striker 4 is attached to a frame positioned in the vicinity of the elbow or shoulder of a driver or a passenger sitting on the seat 28 of the utility vehicle 10. Each of the seats 28 includes a headrest 28c provided on the backrest 28a to support the head of a driver or a passenger sitting on the seat 28.

The bracket 20b of each of the upper sub frames 20 includes the fastening holes 20c. Each of the fastening holes 20c is an elongated hole that is long in the front-rear direction and short in the vertical direction, and has two central portions C11, C12. Hereinafter, the distance between the central portions C11 and C12 is referred to as a central distance D1 of the fastening holes 20c.

The door striker 4 is symmetric with respect to a first center line L1 that connects a center C21 of one of the fastening portions 42b and a center C22 of the other one of the fastening portions 42b. By inverting the door striker 4 along the first center line L1, a second center line L2 that connects a center C31 of one of the rod support portions 42a and a center C32 of the other one of the rod support portions 42a is biased in a direction along the first center line L1 by a distance equal to the central distance D1 of the fastening holes 20c.

The rod 41 has a U-shape protruding outwardly in the vehicle-width direction, and is attached to the base plate 42 at both ends of the U-shape. The second center line L2 extends in the vertical direction, and the first center line L1 is orthogonal to the second center line L2 and extends in the front-rear direction of the utility vehicle 10. In addition, the outer shape of the base plate 42 is asymmetric with respect to the second center line L2.

Figure 8:
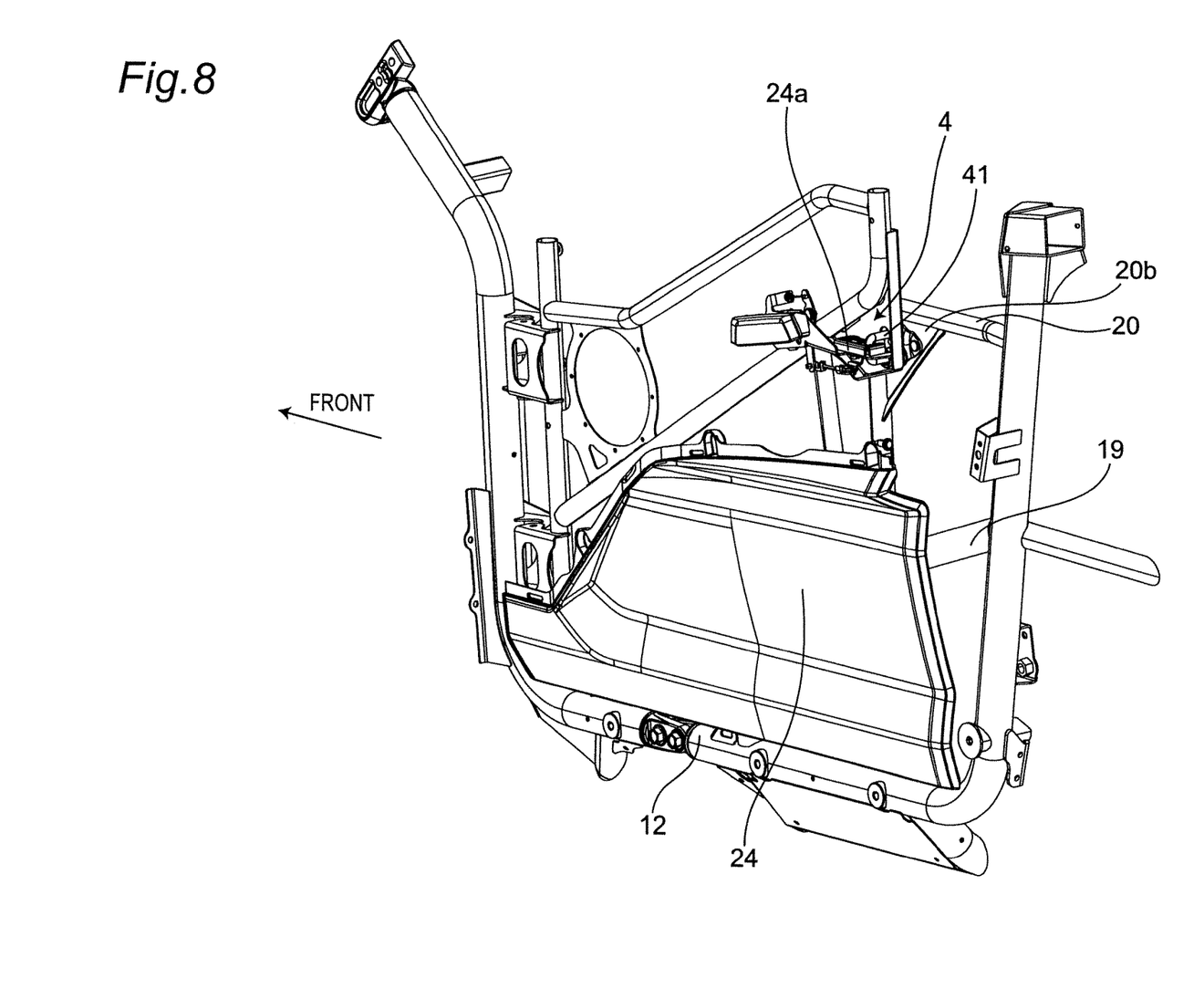
FIG. 8 is a perspective view showing a locked state of the door striker.
Figure 9:
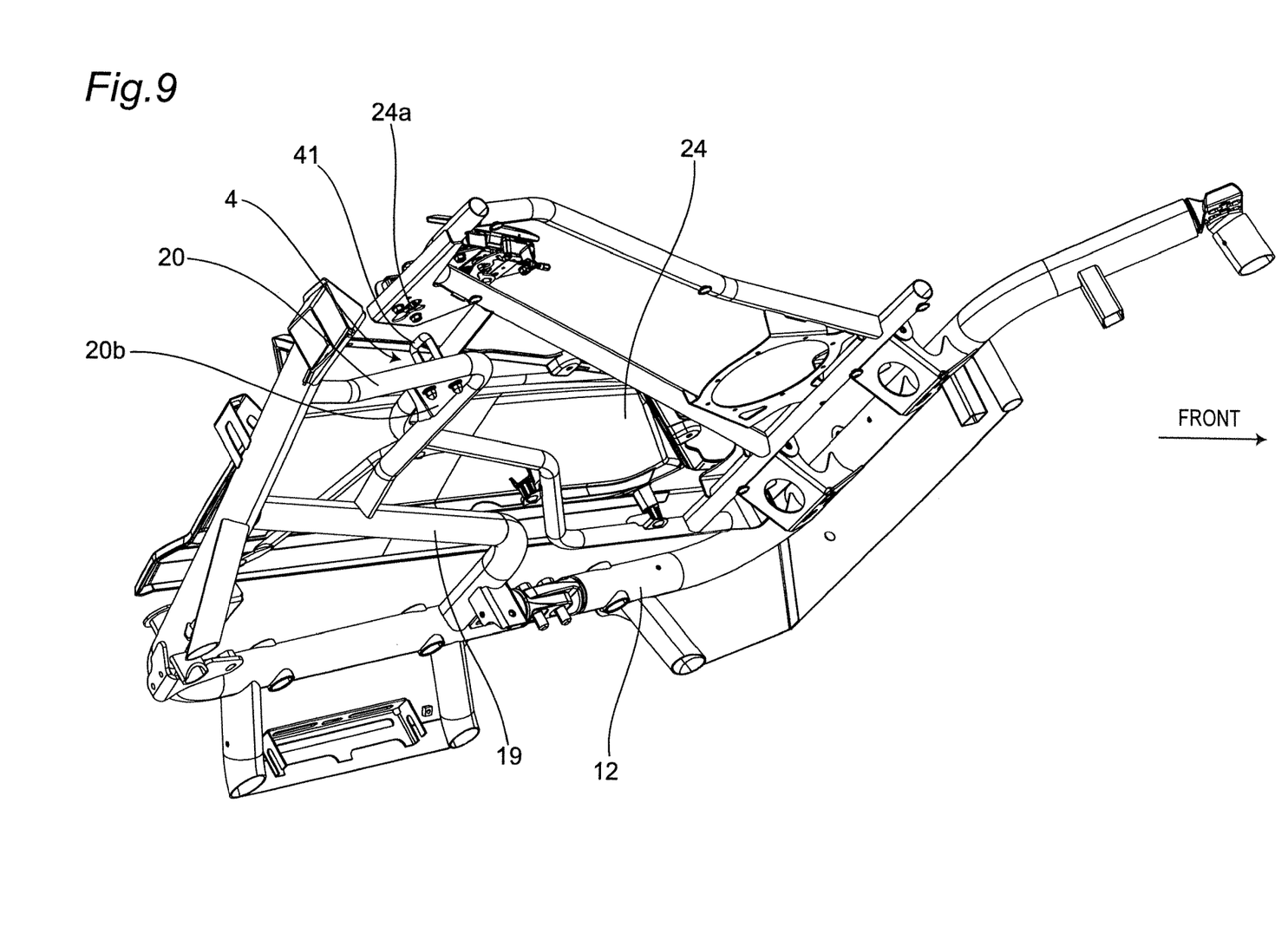
FIG. 9 is a perspective view showing an unlocked state of the door striker.

FIG. 8 is a perspective view showing a locked state of the door striker 4, and FIG. 9 is a perspective view showing an unlocked state of the door striker 4. As shown in FIGS. 8 and 9, a door 24 includes on an inner surface thereof a latch 24a to be detachably engaged with the rod 41 of the door striker 4. The rod 41 is engaged with the latch 24a when the door 24 is in a locked state, and the engagement between the rod 41 and the latch 24a is released when the door 24 is in an unlocked state.

Figure 10:
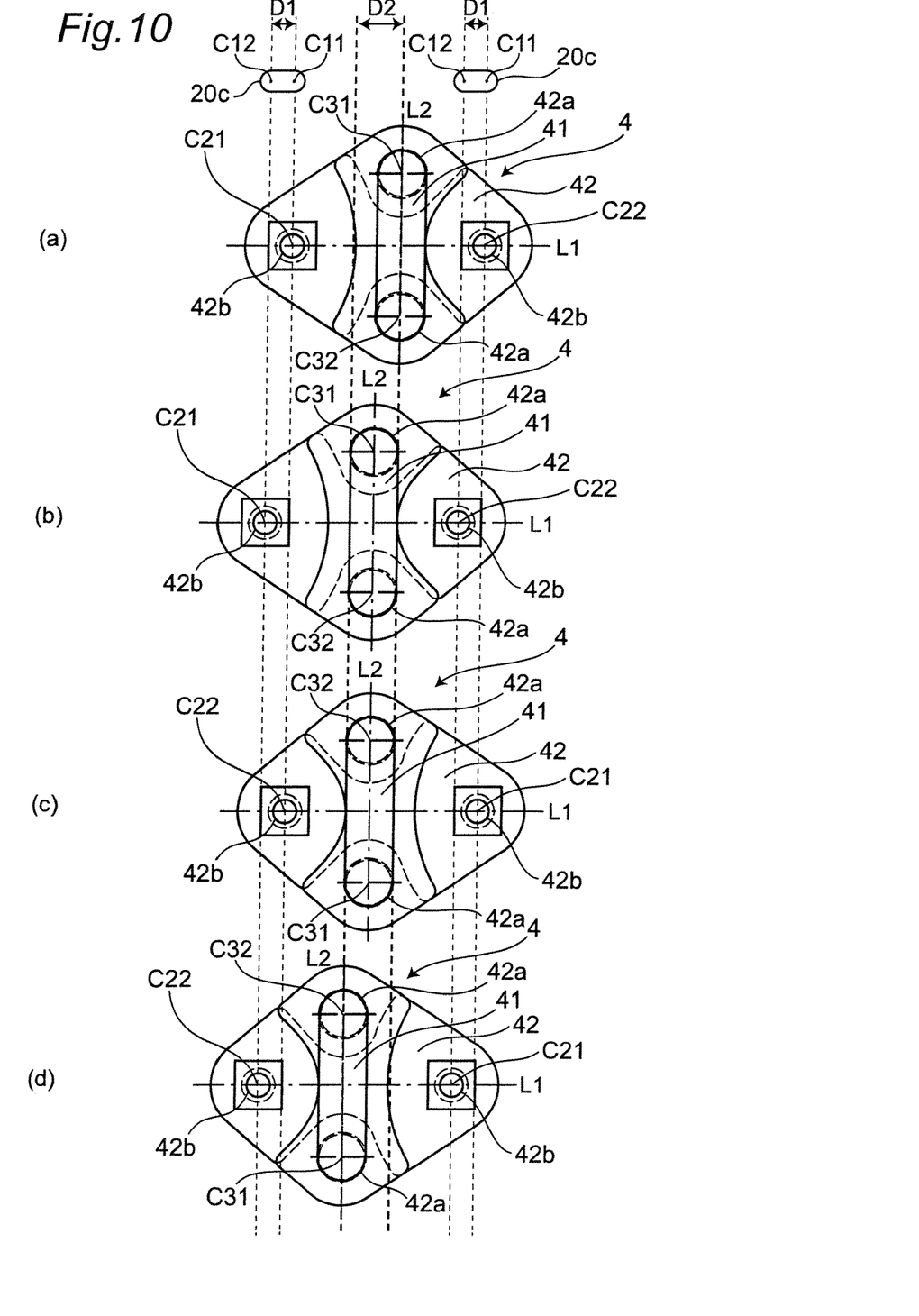

FIG. 10 is a view illustrating attached states of the door striker 4. Each of the fastening holes 20c provided with the bracket 20b is an elongated hole having two central portions C11, C12. As the second center line L2 of the door striker 4 is displaced from the midpoint of the first center line L1 along the first center line, the door striker 4 can be shifted when attached to the bracket 20b, as shown in FIG. 10.

(a) in FIG. 10 shows a state in which the door striker 4 is attached to the bracket 20b corresponding to the central portions C11 of the fastening holes 20c with the second center line L2 of the door striker 4 being shifted from the midpoint of the first center line L1 in one direction along the first center line L1 (the right side in FIG. 10, i.e., in the rearward direction of the vehicle body). In this case, the door striker 4 is attached to the bracket 20b with the second center line L2 being positioned at the rightmost position.

(b) in FIG. 10 shows a state in which the door striker 4 is attached to the bracket 20b corresponding to the central portions C12 of the fastening holes 20c with the second center line L2 of the door striker 4 being shifted rightward from the midpoint of the first center line L1. In this case, the door striker 4 is attached to the bracket 20b with the second center line L2 being positioned in the other direction along the first center line L1 (the left side in FIG. 10, i.e., in the forward direction of the vehicle body) by a distance equal to the central distance D1 of the fastening holes 20c as compared to the state shown as (a) in FIG. 10. In other words, an adjustment allowance equal to the central distance D1 of the fastening holes 20c is provided when the door striker 4 is attached to the bracket 20b in a state in which the second center line L2 of the door striker 4 is shifted rightward from the midpoint of the first center line L1.

(c) in FIG. 10 shows a state in which the door striker 4 is attached to the bracket 20b corresponding to the central portions C11 of the fastening holes 20c with the second center line L2 of the door striker 4 being shifted leftward from the midpoint of the first center line L1. In this case, the door striker 4 is attached to the bracket 20b with the second center line L2 being positioned leftward by a distance equal to the central distance D1 of the fastening holes 20c as compared to the state shown as (a) in FIG. 10. In other words, the second center line L2 in (c) of FIG. 10 coincides with the second center line L2 in (b) of FIG. 10 in the direction along the first center line L1.

(d) in FIG. 10 shows a state in which the door striker 4 is attached to the bracket 20b corresponding to the central portions C12 of the fastening holes 20c with the second center line L2 of the door striker 4 being shifted leftward from the midpoint of the first center line L1. In this case, the door striker 4 is attached to the bracket 20b with the second center line L2 being positioned leftward by a distance equal to the central distance D1 of the fastening holes 20c as compared to the state shown as (c) in FIG. 10. In other words, an adjustment allowance equal to the central distance D1 of the fastening holes 20c is provided when the door striker 4 is attached to the bracket 20b in a state in which the second center line L2 of the door striker 4 is shifted leftward from the midpoint of the first center line L1.

Comparison between (a) and (d) in FIG. 10 shows that an adjustment allowance D2 equal to twice the central distance D1 of the fastening holes 20c can be secured by attaching the door striker 4 to the bracket 20b in a state in which the second center line L2 of the door striker 4 is shifted rightward or leftward from the midpoint of the first center line L1, in other words, by attaching the door striker 4 to the bracket 20b in a state in which the door striker 4 is inverted along the first center line L1. In the case where the central distance D1 of the fastening holes 20c is, for example, 5 mm(±2.5 mm), the adjustment allowance D2 that is twice as large as the above central distance D1, i.e., 10 mm(±5 mm) can be secured by attaching the door striker 4 in a manner inverted along the first center line L1.

A door striker attaching structure having the above configuration exhibits the following effects.

(1) By inverting the door striker 4 along the first center line L1, the second center line L2 that connects the centers of the rod support portions 42a is biased in a direction along the first center line L1 by a distance equal to the central distance D1 of the fastening holes 20c. As a result, an adjustment allowance twice the central distance D1 of the fastening holes 20c can be secured by attaching the door striker 4 to the fastening holes 20c in a manner inverted along the first center line L1. More specifically, the above configuration ensures for the door striker 4 an adjustment allowance equal to the central distance of the fastening holes 20c ±5 mm, while conventional door strikers 4 have an adjustment allowance equal to the central distance of the fastening holes 20c ±2.5 mm.

(2) In the case where the adjustment allowance is to be doubled by changing the length of the fastening holes 20c, the length of the fastening holes 20c needs to be increased accordingly. This results in reduction in the fastening force for fastening the door striker 4, which reduces the contact area between the door striker 4 and the bracket 20b when they are fastened, so that it becomes necessary to increase the thickness and/or the length of the bracket 20b. As a result, the weight of the bracket 20b, that is, the weight of the body frame 1 increases. To the contrary, the above configuration can double the adjustment allowance for attaching the door striker 4 without increasing the weight of the body frame 1.

(3) The outer shape of the base plate 42 that is asymmetric with respect to the second center line L2 makes it easy to grasp an attached state of the door striker 4 (a difference between an attached state in which the rod 41 is shifted in one direction along the first center line L1 and an attached state in which the rod 41 is shifted in the other direction along the first center line L1).

(4) The rod 41 has a U-shape protruding outward in the vehicle-width direction of the utility vehicle 10, and is attached to the base plate 42 at both ends of the U-shape. The second center line L2 extends in the vertical direction, and the first center line L1 is orthogonal to the second center line L2 and extends in the front-rear direction of the utility vehicle 10. As a result, a vertically extending portion of the rod 41 is to be locked with the latch 24a provided on the door 24, so that it is possible to lock the door striker 4 with good resistance to vibration in the vertical direction.

(5) The door striker 4 is attached to the bracket 20b disposed between the upper end of the backrest and the upper end of the seat bottom of each of the seats 28 of the utility vehicle 10. Here, in the case where a driver or a passenger bumps against the door 24, it is usually the elbow or shoulder of the driver or the passenger that bumps against the door 24. Therefore, the door striker 4 is provided on a frame located in the vicinity of the elbow or shoulder of a driver or a passenger to support the door 24, which improves the structural strength of the door 24 at the time when a driver or a passenger bumps against the door 24.

In the above embodiment, the vertically extending portion of the rod 41 is configured to be locked with the latch 24a provided on the door 24. However, the door striker 4 may be provided such that the portion of the rod 41 to be locked with the latch 24a extends in the left-right direction (the front-rear direction of the vehicle body). In this case, the bracket 20b includes a pair of upper and lower fastening holes to which the base plate 42 is fastened.

Various modifications and alterations can be made without departing from the spirit and scope of the present invention described in the claims.

What is claimed is:

1. A door striker attaching structure comprising a door striker having a rod and a base plate,
    wherein the base plate includes a pair of rod support portions to which the rod is connected, and a pair of fastening portions through which the base plate is fastened to a vehicle body of a utility vehicle,
    wherein the vehicle body is provided with fastening holes to which the fastening portions are fastened respectively, and each of the fastening holes is an elongated hole having two central portions,
    wherein the door striker is symmetric with respect to a first center line that connects centers of the fastening portions,
    wherein by inverting the door striker along the first center line, a second center line that connects centers of the rod support portions is biased in a direction along the first center line by a distance equal to a central distance between the central portions of each of the fastening holes,
    wherein the first center line is orthogonal to the second center line,
    wherein the base plate has an outer shape that is asymmetric with respect to the second center line, and
    wherein the outer shape of the base plate is symmetric with respect to the first center line, and positions of respective centers of the two fastening portions are asymmetric with respect to the second center line.

2. The door striker attaching structure according to claim 1,
    wherein the rod has a U-shape protruding outward in a vehicle-width direction of the utility vehicle, and is attached to the base plate at both ends of the U-shape,
    wherein the second center line extends in a vertical direction, and
    wherein the first center line extends in a front-back direction of the utility vehicle.

3. The door striker attaching structure according to claim 1,
    wherein the door striker is attached to a frame that is disposed between an upper end of a backrest and an upper end of a seat bottom of a seat of the utility vehicle.

4. A utility vehicle comprising the door striker attaching structure according to claim 1.

5. The door striker attaching structure according to claim 1,
wherein a distance from a center of one of the fastening portions to the second center line is different from a distance from a center of the other fastening portions to the second center line.

6. The door striker attaching structure according to claim 1,
wherein each of the fastening holes is elongated in the direction along the first center line and short in the direction along the second center line.

* * * * *